(12) United States Patent
Aoki et al.

(10) Patent No.: US 7,915,440 B2
(45) Date of Patent: Mar. 29, 2011

(54) METHOD FOR PREPARING SOLID POLYORGANOSILOXANE

(75) Inventors: Shunji Aoki, Annaka (JP); Ichiro Ono, Annaka (JP); Kiyoyuki Mutoh, Tomioka (JP); Akira Yamamoto, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 981 days.

(21) Appl. No.: 11/790,647

(22) Filed: Apr. 26, 2007

(65) Prior Publication Data
US 2007/0255034 A1 Nov. 1, 2007

(30) Foreign Application Priority Data

Apr. 28, 2006 (JP) .................. 2006-126144

(51) Int. Cl.
*C07F 7/18* (2006.01)
(52) U.S. Cl. ............ 556/450; 556/453; 528/12
(58) Field of Classification Search .......... 528/12; 556/450, 453
See application file for complete search history.

(56) References Cited

U.S. PATENT DOCUMENTS

| | | | |
|---|---|---|---|
| 4,707,531 A | 11/1987 | Shirahata et al. | |
| 5,391,673 A | 2/1995 | Ekeland et al. | |
| 6,197,914 B1 | 3/2001 | Kaeppler et al. | |
| 7,026,427 B2 | 4/2006 | Koehler et al. | |
| 2003/0139481 A1 | 7/2003 | Osawa | |

FOREIGN PATENT DOCUMENTS

| | | |
|---|---|---|
| EP | 0516108 A2 | 12/1992 |
| EP | 0 555 050 A | 8/1993 |
| JP | 61-195129 A | 8/1986 |
| JP | 5-345824 A | 12/1993 |
| JP | 8-027272 A | 1/1996 |

*Primary Examiner* — Elvis O Price
(74) *Attorney, Agent, or Firm* — Birch, Stewart, Kolasch & Birch LLP

(57) ABSTRACT

A method for preparing a polyorganosiloxane which is sold at 25° C. and has $R^1_3SiO_{0.5}$ units wherein $R^1$ is a hydrocarbon group having 1 to 10 carbon atoms and $SiO_2$ units, said method comprising the steps of:

[1] subjecting at least one selected from an organosilane and an organodisiloxane, and at least one selected from a tetralkoxysilane and a partial condensate of hydrolysates of the tetralkoxysilane to hydrolysis reaction and condensation reaction in the presence of an acidic catalyst;

[2] adding a liquid aliphatic hydrocarbon; and subsequently

[3] separating a liquid aliphatic hydrocarbon phase and an aqueous phase and then removing said aqueous phase;

provided that the step [2] may be performed before, during, or after the step [1].

10 Claims, No Drawings

METHOD FOR PREPARING SOLID POLYORGANOSILOXANE

CROSS REFERENCE

This application claims benefit of Japanese Patent application No. 2006-126144 filed on Apr. 28, 2006, the contents of which are hereby incorporated by reference.

FIELD OF THE INVENTION

The present invention relates to a method for preparing a polyorganosiloxane which is solid at 25° C., specifically to a method which does not use an aromatic hydrocarbon solvent but an aliphatic hydrocarbon solvent.

DESCRIPTION OF THE PRIOR ART

A polyorganosiloxane having $R^1_3SiO_{0.5}$ units and $SiO_2$ units, known as MQ resin, is widely used for industrial production of pressure sensitive adhesives, cosmetics, and release agents. MQ resin in the form of sold at 25° C. is usually produced in an aromatic solvent, particularly toluene, as described in the Japanese Patent Application Laid-Open No. 61-195129, corresponding to U.S. Pat. No. 4,707,531. Aromatic solvents, however, are not desirable from environmental and hygienic viewpoints. Removal of the aromatic solvent at a reduced pressure and at an elevated temperature has been practiced. However, the aromatic solvent tends to remain in the MQ resin due to its high affinity to the MQ resin. Even a small amount, residual toluene makes a MQ resin inappropriate for cosmetic use.

The Japanese Patent Application Laid-Open No. 5-345824, corresponding to EP0555050B, discloses a method of preparing a MQ resin in the presence of an aliphatic solvent in place of toluene. The method is intended to produce MQ resins which are highly soluble in a silicone fluid and accordingly are liquid at room temperature.

As a substitute for toluene, a cyclic siloxane is used in the method disclosed in the Japanese Patent Application Laid-Open No. 8-27272. The method, however, requires a long time and much energy in removing water and alcohol at atmospheric pressure or a reduced pressure, while heating a reaction mixture.

SUMMARY OF THE INVENTION

The present invention therefore aims to provide a method of preparing a polyorganosiloxane which is solid at 25° C. in a relatively short time without using an aromatic solvent and energy.

The present invention is a method for preparing a polyorganosiloxane which is solid at 25° C. and has $R^1_3SiO_{0.5}$ units wherein $R^1$ is a hydrocarbon group having 1 to 10 carbon atoms and $SiO_2$ units, said method comprising the steps of:

[1] subjecting at least one selected from an organosilane and an organodisiloxane, and at least one selected from a tetralkoxysilane and a partial condensate of hydrolysates of the tetralkoxysilane to hydrolysis reaction and condensation reaction in the presence of an acidic catalyst;

[2] adding a liquid aliphatic hydrocarbon; and subsequently

[3] separating a liquid aliphatic hydrocarbon phase and an aqueous phase and then removing said aqueous phase; provided that the step [2] may be performed before, during, or after the step [1].

In the aforesaid method of the present invention, a liquid aliphatic hydrocarbon is used, and a phase containing siloxanes and the aliphatic hydrocarbon is separated from a phase mainly containing water and alcohol. This enables one to obtain a polyorganosiloxane from the former phase with a high yield. In addition, there is substantially no residual aliphatic hydrocarbon in the MQ resin obtained.

DESCRIPTION OF THE PREFERRED EMBODIMENTS

The liquid aliphatic hydrocarbon may be a paraffinic, isoparaffinic, or naphthenic solvent. Examples of the liquid aliphatic hydrocarbon include pentane, hexane, heptane, octane, nonane, decane, isooctane, isodecane, isododecane, cyclohexane, methylcyclohexane, ethylcyclohexane, dimethylcyclohexane, and a mixture thereof. Among these, paraffinic and isoparaffinic solvents having 7 to 10 carbon atoms such as heptane, octane, nonane, decane, isooctane, and isodecane are preferred. When the aliphatic hydrocarbon is to be removed to obtain a polysiloxane in the form of solid, the aliphatic hydrocarbon having a boiling temperature of 180° C. or lower is preferred.

The aliphatic hydrocarbon can be added to the reaction system before, during or after the step [1] where hydrolysis and condensation reactions in the presence of an acidic catalyst are carried out, hereinafter referred to as the hydrolysis/condensation step [1]. Alternatively, it may be added after the step [4] where a base is added to a reaction mixture to make the reaction mixture basic and then the reaction mixture is subjected to a condensation reaction while heating, herein after referred to the maturing step [4]. Preferably, the aliphatic hydrocarbon is added after the hydrolysis/condensation step [1] and before the maturing step [4]. The aliphatic hydrocarbon may be added all at once or in several batches. In the latter case, the aliphatic hydrocarbon may be added during the hydrolysis/condensation step [1] and the maturing step [4], respectively. An amount of the aliphatic hydrocarbon to be added ranges from 25 to 250 parts by weight, preferably from 30 to 100 parts by weight per 100 parts by weight of theoretical yield of polyorganosiloxane. The aliphatic hydrocarbon in an amount below the aforesaid lower limit makes the aliphatic hydrocarbon phase too viscous to be separated clearly from the aqueous phase. On the other hand, the aliphatic hydrocarbon in an amount larger than the aforesaid lower limit merely requires higher production costs and longer time for distillation.

The organosilane subjected to the hydrolysis and condensation reactions in the step [1] is triorganoalkoxysilane or triorganohydroxysilane represented by the following formula (1):

$$R_3SiX \qquad (1)$$

wherein R may be the same with or different from each other and is a monovalent hydrocarbon group having 1 to 10 carbon atoms or a hydrogen atom, and X is an alkoxy group or a hydroxyl group. Examples of the hydrocarbon group include alkyl groups such as methyl, ethyl, propyl and butyl groups; cycloalkyl group such as a cyclohexyl group; aryl groups such as phenyl and tolyl groups; and alkenyl groups such as vinyl, allyl, and hexenyl groups, among which methyl and phenyl groups are particularly preferred. Examples of the alkoxy group include methoxy, ethoxy, propoxy, isopropoxy, butoxy, i-butoxy, and t-butoxy groups, among which methoxy and ethoxy groups are preferred.

The organodisiloxane used in place of or in addition to the aforesaid organosilane is a hexaorganodisiloxane represented by the following formula (2):

$$R_3SiOSiR_3 \quad (2)$$

wherein R is as defined above and, preferably, a methyl or phenyl group.

Examples of the organosilane of the formula (1) are $(CH_3)_3SiOH$, $(CH_3)_3SiOCH_3$, and $(CH_3)_2HSiOCH_3$, $(CH_3)_2(CH_2\!\!=\!\!CH)SiOCH_3$. Examples of the organodisiloxane of the formula (2) are $(CH_3)_3SiOSi(CH_3)_3$, $(CH_3)_2HSi\text{-}OSiH(CH_3)_2$, and $(CH_3)_2(CH_2\!\!=\!\!CH)SiOSi(CH_2\!\!=\!\!CH)(CH_3)$. A mixture of these organosilane and organodisiloxane can be used.

The tetraalkoxysilane is represented by the following formula (3):

$$(RO)_4Si \quad (3)$$

wherein R is as defined above and, preferably, a methyl or ethyl group. Example of the partial condensate of hydrolysates of the tetraalkoxysilane include polymethylsilicate, polyethylsilicate, polyisopropoxysilicate and a mixture thereof.

The organosilane, organodisiloxane or a mixture of organosilane and organodisiloxane, and tetralkoxysilane, partial condensate of hydrolysates the tetralkoxysilane or a mixture of tetralkoxysilane and partial condensate of hydrolysates thereof are used in such amounts that a molar ratio, (the organosilane and/or organodisiloxane)/(the tetralkoxysilane and/or partial condensate of hydrolysates the tetralkoxysilane), ranges from 0.6 to 1.7, preferably from 0.6 to 0.9.

In addition to the tetraalkoxysilane, an organosilane of the formula $R_1SiX_3$ or $R_2SiX_2$ can be used wherein R and X are as defined above.

The acidic catalyst used in the hydrolysis/condensation step [1] may be sulfuric acid, methane sulfonic acid, p-toluene sulfonic acid, trifluoromethane sulfonic acid, trifluoroacetic acid, or hydrochloric acid. The acidic catalyst is generally used in an amount of from 0.2 to 25 wt % based on a total weight of the organosilane and/or organodisiloxane, and tetralkoxysilane and/or partial condensate of hydrolysates thereof.

An amount of water to be used for the hydrolysis is such that a molar ratio of water to a total alkoxy group in the tetralkoxysilane and/or partial condensate of hydrolysates thereof ranges from 0.5 to 3, preferably from 0.6 to 2.

The hydrolysis/condensation reactions may be performed as follows. In a reactor, organosilane and/or organodisiloxane and tetraalkoxysilane and/or partial condensate of hydrolysates thereof, an acidic catalyst, and the aliphatic hydrocarbon, if desired, are placed, to which water is added dropwise while stirring the reaction mixture. During the addition of water, a temperature of the reaction mixture is in the range of from 0 to 100° C., preferably from 30 to 80° C. A period time of the addition may ranges from 5 minutes to 1 hour. After completion of the addition, the reaction mixture is heated to a temperature of from 50 to 150° C., preferably from 60 to 120° C., for 2 to 8 hours to promote hydrolysis and condensation reactions.

Alternatively, water, the acidic catalyst, and the aliphatic hydrocarbon solvent, if desired, are placed in a reactor, to which a mixture of the organosilane and/or organodisilane and the tetraalkoxysilane and/or a partial condensate of hydrolysates thereof is added dropwise. During the addition, a temperature of the reaction mixture is in the range of from 0 to 100° C., preferably from 30 to 80° C. A period time of the addition may ranges from 5 minutes to 1 hour. After completion of the addition, the reaction mixture is heated to a temperature of from 50 to 150° C., preferably from 60 to 120° C., for 2 to 8 hours to promote hydrolysis and condensation reactions.

After the hydrolysis/condensation reactions, the acidic catalyst is neutralized with an alkaline substance such as an alkali metal carbonate salt, alkali metal bicarbonate salt or alkali metal hydroxide.

Preferably, to adjust a molecular weight of the organopolysiloxane obtained, the method further comprises the maturing step [4] of adding a base to make a reaction mixture basic, followed by subjecting the reaction mixture to a condensation reaction while heating. Examples of the base include sodium hydroxide, potassium hydroxide, sodium bicarbonate, potassium bicarbonate, sodium carbonate and potassium carbonate. After the maturing step [4], excess amount of the base is neutralized with an organic acid such as acetic acid or citric acid. Preferably, after the maturing step [4] and before the step [3], an aqueous solution of acetic acid or citric acid is added, whereby not only neutralization of the reaction mixture but also clearer and faster phase separation in the step [3] is attained.

By changing a mixing ratio of raw materials such as the organosilane, a ratio of $R^1{}_3SiO_{0.5}$ unit to $SiO_2$ unit in a resulting polysiloxane can be varied according to an intended use of the polysiloxane. By using tri- or di-organosilane in addition to the tetraalkoxysilane, $R^1{}_2SiO_{1.0}$ unit or $R^1SiO_{1.5}$ may be introduced to the polysiloxane.

After the hydrolysis/condensation step [1], or after the maturing step [4], if employed, the step of separating a liquid aliphatic hydrocarbon phase from an aqueous phase, followed by removing the aqueous phase [3], hereinafter referred to as the separation step [3], is performed. The liquid aliphatic hydrocarbon phase mainly contains a polysiloxane obtained and the liquid aliphatic hydrocarbon, whereas the aqueous phase mainly contains alcohol produced by the hydrolysis and water. In the separation step [3], a polysiloxane substantially free of residual aliphatic hydrocarbon can be obtained with a good yield. A period of time required for the two phases to separate typically ranges from 10 minutes to 3 hours, though it varies depending on amounts of a reaction mixture and the aliphatic hydrocarbon. This period of time is much shorter than time required for distilling alcohol and water off by heating. Subsequently, the aqueous phase is removed whereby a solution of the organopolysiloxane in the aliphatic hydrocarbon is obtained. In the aliphatic hydrocarbon phase, a small amount of alcohol and water may be contained, but they can be easily removed by azeotropic distillation with the aliphatic hydrocarbon. When an insoluble matter such as salt is contained in the aliphatic hydrocarbon phase, it can be removed by filtration.

Preferably, water is added immediately before the separation step [3] to promote phase separation. Alternatively, when the maturing step [4] is employed, an aqueous solution of an organic acid in place of water is added to a reaction mixture. An amount of water or the aqueous solution of the organic acid to be added ranges from 1 to 200 parts by weight, preferably from 3 to 60 parts by weight per 100 parts by weight of theoretical yield of the polysiloxane. The aqueous solution of the organic acid is 1 to 20 wt % of an aqueous solution of an organic acid such as acetic acid, citric acid, formic acid, propionic acid, lactic acid, benzoic acid, oxalic acid, malonic acid, succinic acid, adipic acid, maleic acid, phthalic acid, acetoacetic acid, chloroacetic acid, methane sulfonic acid, p-toluene sulfonic acid and a mixture thereof.

The polyorganosiloxane in the form of solid can be isolated from the aliphatic hydrocarbon solution by heating it at atmospheric pressure or a reduced pressure while rotating the solution; spraying the solution in air flow with a spray dryer; or heating the solution with a heating medium fluid. Prior to the isolation, the aliphatic hydrocarbon solution may be condensed by heating at a reduced pressure. The polyorganosiloxane thus isolated may be post-treated such as drying, for instance. When the polyorganosiloxane obtained is aggregated, it may be pulverized with a mill such as jet mill, ball mill and hammer mill, and classified.

EXAMPLES

The present invention is explained with reference to the following examples, but not limited thereto. In the examples, the term "parts" means "parts by weight" and "Me" represents a methyl group unless otherwise specified. A molecular weight was determined by GPC using polystyrene standards.

Example 1

In a reactor, 500 parts of hexamethyldisiloxane, 1100 parts of polyethylsilicate having $SiO_2$ content of 40%, and 9.0 parts of sulfuric acid were placed. The mixture obtained was heated at 50° C., to which 297 parts of water was added dropwise while stirring the mixture. After the addition of water completed, the reaction mixture was heated at 77° C. for 5 hours. To the reaction mixture, 350 parts of isoparaffin having a boiling point of from 90 to 140° C. and then 21 parts of an aqueous solution of potassium hydroxide were added and heated at 70° C. for 2 hours. Then, the reaction mixture was neutralized with 200 parts of an aqueous solution of citric acid. The neutralized reaction mixture was left standing for 30 minutes, allowing the mixture to separate in an aqueous layer and an isoparaffin layer. The aqueous layer was discarded. From the isoparaffin layer obtained, water and alcohol were removed by distillation while heating and stirring the layer. It took two hours for water and alcohol to be distilled off. To the residue of the distillation, isoparaffin was added in such an amount that a solid content of a resulting isoparaffin solution was 70%. By removing insoluble substances by filtration, 1320 parts, corresponding to 98% yield, of an isoparaffin solution of a polyorganosiloxane having $Me_3SiO_{0.5}$ units and $SiO_2$ units with a molar ratio of $Me_3SiO_{0.5}$ units to $SiO_2$ units being 0.84 was obtained. The polyorganosiloxane solution had a solid content of 69.8% and a viscosity of 27.9 $mm^2/s$. The polyorganosiloxane had an average molecular weight of 2400 reduced to polystyrene.

Example 2

The isoparaffin solution of the polyorganosiloxane obtained in Example 1 was spray-dried to remove isoparaffin. The polyorganosiloxane in the form of powder was obtained. The polyorganosiloxane was analyzed by headspace gas chromatography by placing 0.5 g of the polyorganosiloxane in a 20 ml vial, heating the vial at 80 C for 20 minutes, and then analyzing a volume of the headspace by gas chromatography. It was found that a residual isoparaffin content in the polyorganosiloxane was below a detection limit of 1 ppm.

Comparative Example 4

In a reactor, 428 parts of hexamethyldisiloxane, 1100 parts of polyethylsilicate having $SiO_2$ content of 40%, and 9.0 parts of sulfuric acid were placed. The mixture obtained was heated at 50° C., to which 297 parts of water was added dropwise while stirring the mixture. After the addition of water completed, the reaction mixture was heated at 77° C. for 5 hours. To the reaction mixture, 350 parts of heptane and then 21 parts of an aqueous solution of potassium hydroxide were added and heated at 70° C. for 2 hours. Then, the reaction mixture was neutralized with 200 parts of an aqueous solution of citric acid. The neutralized reaction mixture was left standing for 30 minutes, allowing the mixture to separate in an aqueous layer and a heptane layer. The aqueous layer was discarded. From the heptane layer obtained, water and alcohol were removed by distillation while heating and stirring the layer. It took 1 hour and 45 minutes for water and alcohol to be distilled off. To the residue of the distillation, heptane was added in such an amount that a solid content of a resulting heptane solution was 70%. By removing insoluble substances by filtration, 1136 parts, corresponding to 92% yield, of a heptane solution of a polyorganosiloxane having $Me_3SiO_{0.5}$ units and $SiO_2$ units with a molar ratio of $Me_3SiO_{0.5}$ units to $SiO_2$ units being 0.72 was obtained. The polyorganosiloxane solution had a solid content of 70.3% and a viscosity of 38.9 $mm^2/S$. The polyorganosiloxane had an average molecular weight of 3100 reduced to polystyrene.

Example 4

The heptane solution of the polyorganosiloxane obtained in Example 3 was spray-dried to remove heptane. The polyorganosiloxane in the form of powder was obtained. The headspace gas chromatographic analysis in the same manner as in Example 2 of the polyorganosiloxane confirmed that a residual heptane content in the polyorganosiloxane was below a detection limit of 1 ppm.

Comparative Example 5

In a reactor, 468 parts of hexamethyldisiloxane, 439 parts of water, 293 parts of hydrochloric acid, 146 parts of ethanol and 293 parts of isoparaffin were placed and heated at 70° C., to which 1520 parts of tetraethoxysilane was added dropwise. After the addition of tetraethoxysilane completed, the reaction mixture was heated at 70° C. for 5 hours. The reaction mixture obtained was left standing for 30 minutes, allowing the mixture to separate in an aqueous layer and an isoparaffin layer. The aqueous layer was discarded. From the isoparaffin layer obtained, water and alcohol were removed by distillation while heating the layer. It took one hour and 50 minutes for water and alcohol to be distilled off. To the residue of the distillation, isoparaffin was added in such an amount that a solid content of a resulting isoparaffin solution was 60%. By removing insoluble substances by filtration, 1429 parts, corresponding to 95% yield, of an isoparaffin solution of a polyorganosiloxane having $Me_3SiO_{0.5}$ units and $SiO_2$ units with a molar ratio of $Me_3SiO_{0.5}$ units to $SiO_2$ units being 0.79 was obtained. The polyorganosiloxane solution had a solid content of 60.5% and a viscosity of 5.9 $mm^2/S$. The polyorganosiloxane had an average molecular weight of 2900 reduced to polystyrene.

Example 6

The isoparaffin solution of the polyorganosiloxane obtained in Example 5 was spray-dried to remove isoparaffin. The polyorganosiloxane in the form of powder was obtained. The headspace gas chromatographic analysis in the same manner as in Example 2 of the polyorganosiloxane confirmed that residual isoparaffin content in the polyorganosiloxane was below the detection limit of 1 ppm.

Comparative Example 1

In a reactor, 500 parts of hexamethyldisiloxane, 1100 parts of polyethylsilicate having $SiO_2$ content of 40%, and 9.0 parts of sulfuric acid were placed. The mixture obtained was heated at 50° C., to which 297 parts of water was added dropwise while stirring the mixture. After the addition of water completed, the reaction mixture was heated at 77° C. for 5 hours. To the reaction mixture, 350 parts of isoparaffin having a boiling point of from 90 to 140° C. and then 21 parts of an aqueous solution of potassium hydroxide were added and heated at 70° C. for 2 hours. Then, the reaction mixture was neutralized with 200 parts of an aqueous solution of citric acid. From the neutralized reaction mixture, water and alcohol ware distilled off while heating and stirring the reaction mixture. It took 6.5 hours for water and alcohol to be distilled off. To the residue of the distillation, isoparaffin was added in such an amount that a solid content of a resulting isoparaffin solution was 70%. By removing insoluble substances by filtration, 1296 parts, corresponding to 97% yield, of an isoparaffin solution o a polyorganosiloxane having $Me_3SiO_{0.5}$ units and $SiO_2$ units with a molar ratio of $Me_3SiO_{0.5}$ units to $SiO_2$ units being 0.84 was obtained. The polyorganosiloxane solution had a solid content of 70.3% and a viscosity of 30.2 $mm^2/s$. The polyorganosiloxane had an average molecular weight of 2600 reduced to polystyrene.

Comparative Example 2

In a reactor, 500 parts of hexamethyldisiloxane, 1100 parts of polyethylsilicate having $SiO_2$ content of 40%, and 9.0 parts of sulfuric acid were placed. The mixture obtained was heated at 50° C., to which 297 parts of water was added dropwise while stirring the mixture. After the addition of water completed, the reaction mixture was heated at 77° C. for 5 hours. To the reaction mixture, 350 parts of toluene and then 21 parts of an aqueous solution of potassium hydroxide were added and heated at 70° C. for 2 hours. Then, the reaction mixture was neutralized with 200 parts of an aqueous solution of citric acid. The reaction mixture was left standing for 30 minutes. Separation between a toluene layer and an aqueous layer was not clear, so that the reaction mixture was kept standing for further two hours. The separation between the toluene layer and the aqueous layer got clearer but there was an intermediate layer between the two layers. The aqueous layer and the intermediate layer were discarded. From the toluene layer obtained, water and alcohol ware distilled off while heating and stirring the toluene layer. It took two hours for water and alcohol to be distilled off. To the residue of the distillation, toluene was added in such an amount that a solid content of a resulting toluene solution was 70%. By removing insoluble substances by filtration, 1203 parts, corresponding to 89% yield, of a solution of a polyorganosiloxane having $Me_3SiO_{0.5}$ units and $SiO_2$ units with a molar ratio of $Me_3SiO_{0.5}$ units to $SiO_2$ units being 0.84 was obtained. The polyorganosiloxane solution had a solid content of 69.5% and a viscosity of 21.5 $mm^2/s$. The polyorganosiloxane had an average molecular weight of 2900 reduced to polystyrene.

Comparative Example 3

The toluene solution of the polyorganosiloxane obtained in Comparative Example 2 was spray-dried to remove toluene. The polyorganosiloxane in the form of powder was obtained. The headspace gas chromatographic analysis in the same manner as in Example 2 of the polyorganosiloxane determined 31 ppm of residual toluene in the polyorganosiloxane.

The method used in Comparative Example 1 lacked the separation step. It took longer time and more energy than the method of the present invention. The method used in Comparative Example 2 employed toluene. The toluene layer was not clearly separated from the aqueous, so that a yield of MQ resin was lower than the Examples. Further, significantly larger amount of toluene remained in the polyorganosiloxane.

The method of the present invention thus can save energy and time for producing a solid polyorganosiloxane free of residual solvent.

The invention claimed is:

1. A method for preparing a polyorganosiloxane which is solid at 25° C. and has $R^1_3SiO_{0.5}$ units wherein $R^1$ is a hydrocarbon group having 1 to 10 carbon atoms and $SiO_2$ units, said method comprising the steps of:
   - [1] subjecting at least one selected from an organosilane and an organodisiloxane, and at least one selected from a tetralkoxysilane and a partial condensate of hydrolysates of the tetralkoxysilane to hydrolysis reaction and condensation reaction in the presence of an acidic catalyst;
   - [2] adding an isoparaffinic solvent having 7 to 10 carbon atoms in an amount of from 25 to 250 parts by weight per 100 parts by weight of a theoretical yield of the polyorganosilixane, provided that the step [2] may be performed before, during, or after the step [1];
   - [3] adding a basic substance to the reaction mixture to make the reaction mixture basic, followed by subjecting the reaction mixture to a condensation reaction while heating;
   - [4] adding an aqueous solution of an organic acid to neutralize the reaction mixture; and subsequently
   - [5] separating a liquid aliphatic hydrocarbon phase and an aqueous phase and then removing said aqueous phase.

2. The method according to claim 1, wherein the step [2] is performed after the step [1] and before the step [4].

3. The method according to claim 1, wherein the method further comprises, immediately before the step [3], the step of [5] adding water.

4. The method according to claim 1, wherein the acidic catalyst is selected from the group consisting of sulfuric acid, methane sulfonic acid, p-toluene sulfonic acid, trifluoromethane sulfonic acid, and trifluoroacetic acid.

5. The method according to claim 1, wherein the basic substance is selected from the group consisting of sodium hydroxide, potassium hydroxide, sodium bicarbonate, potassium bicarbonate, sodium carbonate and potassium carbonate.

6. The method according to claim 1, wherein the organic acid is selected from the group consisting of citric acid and acetic acid.

7. A polyorganosiloxane which is solid at 25° C. and has $R^1_3SiO_{0.5}$ units wherein $R^1$ is a hydrocarbon group having 1 to 10 carbon atoms and $SiO_2$ units, characterized in that the polyorganosiloxane has zero to less than 1 ppm of an aromatic hydrocarbon content.

8. The method according to claim 1, wherein the isoparaffinic solvent is added in an amount of from 30 to 100 parts by weight per 100 parts by weight of a theoretical yield of the polyorganosiloxane.

9. The method according to claim 1, wherein the aqueous solution of the organic aid is 1 to 20 weight percent solution.

10. The method according to claim 1, wherein the aqueous solution of the organic acid is added in an amount of from 3 to 60 parts by weight per 100 parts by weight of theoretical yield of the polysiloxane.

\* \* \* \* \*